United States Patent
Hobday et al.

[15] 3,679,019
[45] July 25, 1972

[54] VEHICLE GUIDANCE SYSTEMS

[72] Inventors: Stephen William Hobday; David Stephen Hobday, both of 219 Sycamore Rd., Farnborough, England

[22] Filed: June 29, 1970

[21] Appl. No.: 50,398

[30] Foreign Application Priority Data

July 1, 1969 Great Britain......................33,286/69

[52] U.S. Cl. .........................................180/98, 180/79.2 R
[51] Int. Cl............................................................B62d 1/24
[58] Field of Search ..................180/98, 79, 79.1, 82; 172/2, 172/6; 318/576, 580, 587, 608, 683

[56] References Cited

UNITED STATES PATENTS

| 3,482,644 | 12/1969 | Krieger et al. | 180/98 |
| 3,513,931 | 5/1970 | Warner et al. | 180/98 |
| 2,835,858 | 5/1958 | Moseley | 318/576 |
| 2,847,080 | 8/1958 | Zworykin et al. | 180/98 |
| 2,921,179 | 1/1960 | Anderson | 318/576 |

Primary Examiner—Kenneth H. Betts
Attorney—Wenderoth, Lind & Ponack

[57] ABSTRACT

A vehicle guidance system in which a vehicle (e.g., a tractor) follows a conductor carrying a guidance signal. Steering control is effected in response to an error signal representative of divergence of the vehicle from the required track. A pulse generator gives a variable mark/space ratio output in accordance with the amplitude of the error signal and the pulse generator output is directed to operate a left- or right-hand on-off fluid valve in accordance with the sign of the error signal. The fluid valves are thus controlled by the variable mark/space signal to give proportional control although they are on-off valves.

5 Claims, 3 Drawing Figures

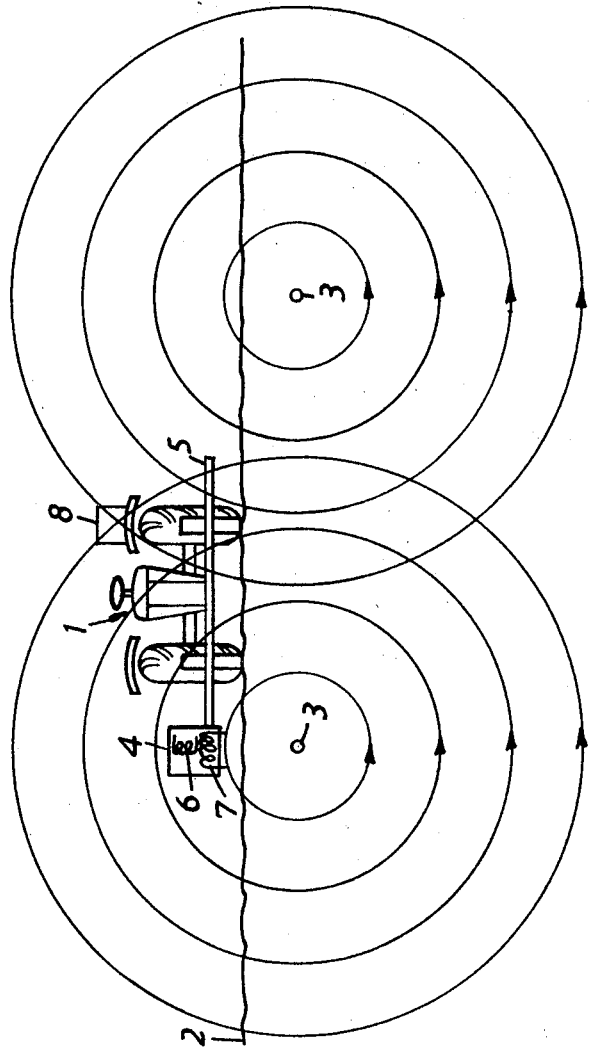

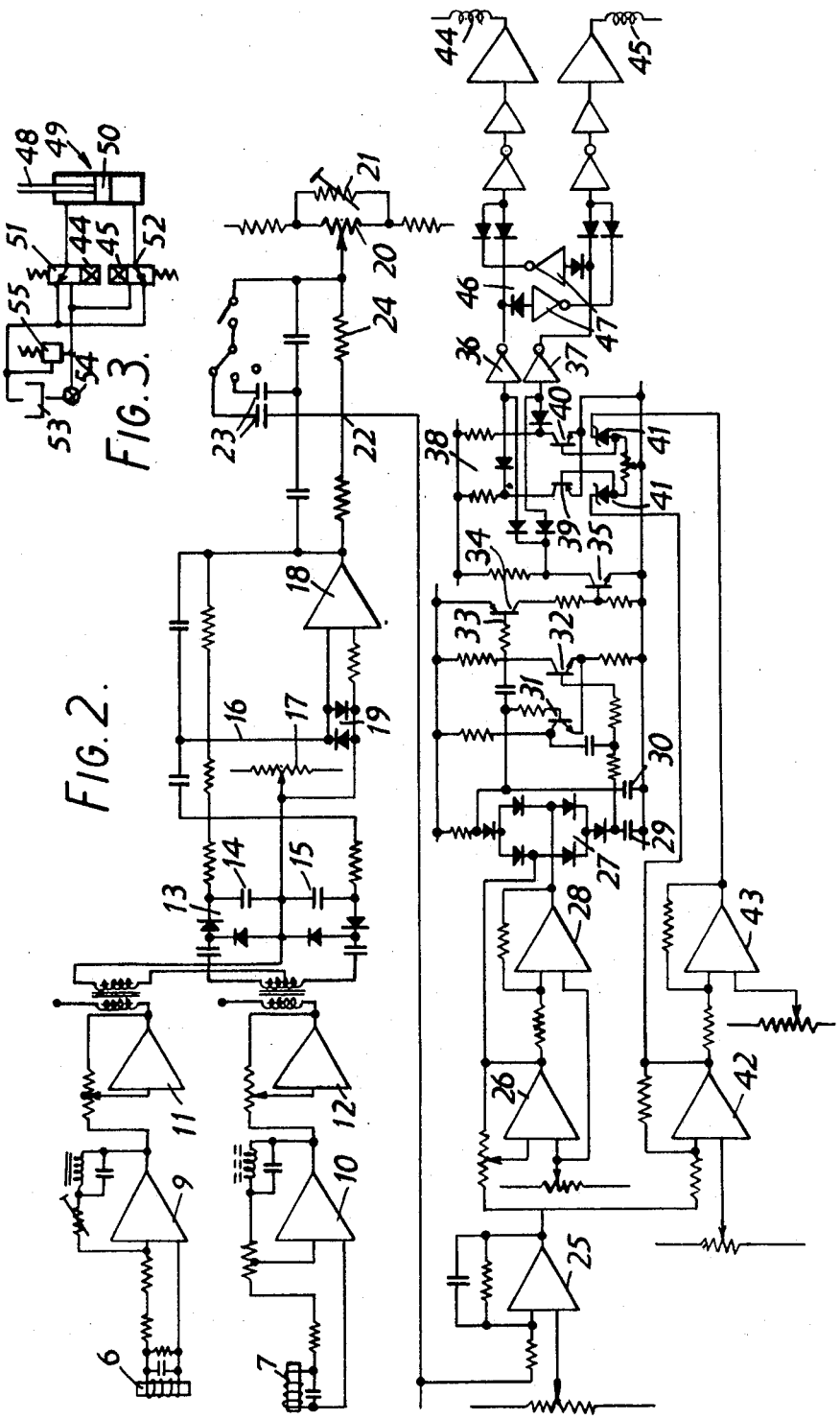

VEHICLE GUIDANCE SYSTEMS

This invention relates to vehicle guidance systems of the kind in which the movement of the vehicle is controlled by signals emitted from a conductor arranged along the path on which the vehicle is to travel.

In such systems the vehicle carries a device which responds to signals in the conductor to produce an error signal which varies in magnitude and sign according to the divergence of the actual path of the vehicle from the path it is required to follow. Such error signal is applied to control the supply of pressure fluid to either end of a cylinder the piston in which is connected with the steering gear of the vehicle. In known systems this has required the use of expensive and complicated arrangements of control valves and it is an object of the present invention to provide an improved arrangement which is cheaper to manufacture and simpler in use.

According to the present invention there is provided a vehicle guidance system in which a vehicle is steered to follow a conductor in response to signals emitted by the conductor, the vehicle having mounted thereon a signal detector; discriminator means for deriving from the signal detector an error signal representative of the steering error in magnitude and sign; a pulse-train generator for generating a train of control pulses having a mark/space ratio dependent upon the magnitude of the error signal; gate means for directing the pulse train to energize a first or a second steering solenoid in dependence on the sign of the error signal; and a fluid-actuated steering ram arrangement provided with right and left on-off valves operated respectively by the first and second solenoids to steer the vehicle to the right and left.

By using solenoid operated on-off valves of conventional type, considerable economies can be effected and it has also been found that when modulated by the pulse generator in the manner described the quantity of fluid passed in a given time varies substantially linearly with variations in magnitude of the error signal.

Preferably the signal detector comprises a pair of mutually perpendicular coils and the discriminator means comprises a phase discriminator which derives a signal representative of the phase difference of the signals in the two coils. Preferably the coils are vertical and horizontal, in which case the horizontal coil may be regarded as the reference coil and the vertical coil as the detector coil.

Preferably there is included a feedback circuit mechanically coupled to the vehicle steering mechanism to generate a feedback signal which is combined with the output from the discriminator means to give the error signal.

The invention will further be described with reference to the accompanying drawings, of which:

FIG. 1 is a diagrammatic elevation of a tractor being guided by a system in accordance with the invention;

FIG. 2 is an electrical circuit diagram of the guidance apparatus carried by the tractor of FIG. 1; and FIG. 3 is a hydraulic circuit diagram of the steering mechanism for the tractor.

Referring to FIG. 1, there is shown a tractor 1 automatically ploughing a field beneath the surface 2 of which have been buried an insulated guide conductor wire 3 having a number of parallel runs along the field. The wires are about 6 meters apart and one-half meter deep. They carry a continuous tone current of 2 kHz and the consequent alternating field is detected by a detector head 4 carried on the tractor. Head 4 is carried on a boom 5 across the front of the tractor and is movable along the boom so that the tractor may follow the same conductor wire for several parallel runs across the field, with appropriate shifting of the head 4.

The detector head has a vertical pick-up coil 6 and a horizontal pick-up coil 7 wound on ferrite rods. With this arrangement the relative phase of the 2 kHz currents induced in the two coils changes in accordance with the position of the detector head with respect to the guide wire. With the head directly above a guide wire there is no phase difference. If the head is then moved to the right or left there is a phase difference in an appropriate sense and of a magnitude proportional to the distance moved.

FIG. 2 is a diagram of the steering control circuit which is mounted on the tractor in a box 8 (FIG. 1). Referring to FIG. 2, the output currents from coils 6 and 7 are fed through tuned amplifiers 9 and 10 respectively and additional amplifiers 11 and 12 to a phase discriminator 13 which charges one or other of capacitors 14 and 15, depending on the sense of the phase difference, with a voltage of a magnitude dependent upon the size of the phase difference. The output from the discriminator is derived on a lead 16 with respect to a variable reference voltage from a potentiometer 17. Adjustment of potentiometer 17 is effective to vary the zero phase point of the discriminator, so that under some circumstances zero output may be given when the detector head is not directly over the wire 3.

The discriminator output is applied to a feedback amplifier 18 through an input limiter 19 to avoid amplifier saturation. The output from amplifier 18 is thus a unidirectional signal, the sign and amplitude of which is dependent upon the sense and magnitude of the divergence of the tractor from the required path. This signal may be used directly to control the steering correction. However, in order to avoid overshoot of the steering correction and provide control stability this signal is combined with a feedback signal representative of the instantaneous attitude of the steering mechanism. The feedback signal is derived from a potentiometer 20 coupled to the steering mechanism. Sensitivity control is effected by means of a potentiometer 21.

The discriminator output and feedback signal are added at a summing point 22. The lead or lag of the feedback signal may be adjusted to alter the control characteristics by switching additional by-pass capacitors 23 for input resistor 24. Thus, if a left-hand correction is required and the steering wheels are already directed appropriately, the signal from the discriminator is annulled to a large extent by the feedback signal. The combined discriminator and feedback signal is the error signal.

The error signal is applied to a buffer amplifier 25 and thence to an amplifier 26, the output from which is applied to one input of a bridge rectifier circuit 27. The output from amplifier 26 is also applied to the input of a unity gain inverting amplifier 28, the output of which is applied to the other input of the bridge rectifier circuit 27. The output from circuit 27 is represented by the difference in voltage across capacitors 29 and 30, and is dependent only on the amplitude of the error signal and not upon its sign.

The voltages on capacitors 29 and 30 are applied respectively to the bases of a pair of transistors 31, 32 which are coupled as a free-running multi-vibrator giving a square wave pulse train at its output 33 of 10 Hz. The mark/space ratio of this output is variable and depends upon the amplitude of the voltage difference across bridge 27. The pulse generator circuit is adjusted so that at the minimum, when the error signal amplitude is lowest, the "mark" time of its output is 10 percent. When the error signal amplitude is maximum the "-mark" time is 100 percent.

The output at 33 is amplified by transistors 34, 35 and applied separately to the inputs of two inverters 36, 37. However, only one inverter at a time actually receives an input because of control by a gating circuit 38. In the gating circuit one or other of transistors 39, 40, conducts at any one time in accordance with whether the sign of the error signal is positive or negative, requiring a left or right-hand steering correction. The sign of the error signal is determined by zener diodes 41, one of which receives an error signal input directly from the output of an amplifier 42 connected to the output of buffer amplifier 25. The other zener diode receives an input from a unity gain inverting amplifier 43 which processes the signal from amplifier 42. Thus, the pulse train signal to one of the invertors 36, 37 is short circuited by the appropriate transistor 39, 40 when the error signal sign indicates that it is the other steering channel which should be operative.

Invertor 36 controls the left turn steering channel and applies the controlling pulse train through amplifiers to a solenoid 44 which opens a valve in response to the "marks" to turn the tractor left. Invertor 37 similarly operates a right turn solenoid 45. In order to ensure that only one steering channel operates at a time there is provided an interlock arrangement 46 comprising diodes and invertors 47 so arranged that pulse train signals applied in one channel are effective to inhibit the other channel from operating.

Referring now to FIG. 3, there is shown the hydraulic circuit for the tractor. The steering control rod (not shown) of the tractor is fixed to the rod 48 of a double-acting hydraulic ram 49. Fluid is admitted to one side or the other of the ram piston 50 by on-off valves 51, 52 which are operated by the solenoids 44, 45 respectively. The valves are spring-return valves and they are opened by the "marks" of the pulse train, at a frequency of 10 Hz. The hydraulic reservoir 53, pump 54 and pressure control valve 55 are shown.

It will be seen that the control of the "mark" time down only to 10 percent allows the oscillator to run continuously and errors due to stopping and re-starting the oscillator are avoided.

The setting of the potentiometers at the inputs of amplifiers 42 and 43 control the points at which the zener diodes 41 start to conduct. In practice these potentiometers are set so that there is a region about the central position in which both zener diodes conduct simultaneously, so that no output signal is given in either control channel. This gives a dead space in the control characteristics at the central position of the tractor. This alleviates any tendency of the steering control to hunt.

We claim:

1. A vehicle guidance system in which a vehicle is steered to follow an electric conductor in response to signals emitted by the conductor, the vehicle having mounted thereon a signal detector comprising a pair of mutually perpendicular coils; a phase discriminator for deriving from the phase difference of signals in the two coils, an error signal representative in magnitude and sign of the positional error of the vehicle in relation to the conductor; a pulse-train generator for generating a train of control pulses having a mark/space ration dependant upon the magnitude of the error signal; gate means for directing the pulse train to energize a first or a second steering solenoid in dependence on the sign of the error signal; and a fluid-actuated steering ram arrangement provided with right and left on-off valves operated respectively by the first and second solenoids to steer the vehicle to the right and left.

2. A system as claimed in claim 1, wherein one coil has a vertical axis and the other coil has a horizontal axis.

3. A system as claimed in claim 1, including a feedback circuit mechanically coupled to the vehicle steering mechanism to generate a feedback signal which is combined with the output from the discriminator means to give the error signal.

4. A system as claimed in claim 1, wherein the steering solenoids open their respective on-off valves when receiving the "marks" of the pulse train and the pulse-train generator has a range of "mark" time control from 10 to 100 percent.

5. A system as claimed in claim 1, wherein the frequency of the pulse train is approximately 10 Hz.

* * * * *